United States Patent
Fujioka

(10) Patent No.: US 9,289,044 B2
(45) Date of Patent: Mar. 22, 2016

(54) TABLET BUMPER ASSEMBLY

(71) Applicant: Fuhu Holdings, Inc., El Segundo, CA (US)

(72) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 37 days.

(21) Appl. No.: 14/453,570

(22) Filed: Aug. 6, 2014

(65) Prior Publication Data
US 2015/0041505 A1 Feb. 12, 2015

Related U.S. Application Data

(60) Provisional application No. 61/862,903, filed on Aug. 6, 2013.

(51) Int. Cl.
 G06F 1/16 (2006.01)
 A45C 13/00 (2006.01)
 A45C 11/00 (2006.01)

(52) U.S. Cl.
 CPC ............ A45C 13/002 (2013.01); G06F 1/1628 (2013.01); *A45C 2011/003* (2013.01); *Y10T 29/49826* (2015.01)

(58) Field of Classification Search
 USPC .......... 455/575.8, 575.3, 575.1, 575.7, 414.1; 248/176.1, 127, 447, 346.02, 222.11, 248/68, 682, 316.1, 460; 361/679.56, 361/679.33, 679.07, 679.35, 679.01, 361/679.06, 679.21, 679.02, 679.55, 361/679.03, 679.26, 679.08, 679.12, 361/679.48, 679.54, 679.41; 345/156, 163, 345/629, 175, 174, 173, 168, 169; 206/45.24, 305, 37; 312/223.1, 236, 312/223.2, 223.3, 331, 216, 333
 See application file for complete search history.

(56) References Cited

U.S. PATENT DOCUMENTS

| | | | | |
|---|---|---|---|---|
| 7,079,383 B2 * | 7/2006 | Homer | ............ | G06F 1/1616 312/223.1 |
| 7,221,559 B1 * | 5/2007 | Duarte | ............ | G06F 1/1624 361/679.02 |
| 2005/0057896 A1 * | 3/2005 | Homer | ............ | G06F 1/1616 361/679.35 |

* cited by examiner

*Primary Examiner* — Hung Duong
(74) *Attorney, Agent, or Firm* — Steptoe & Johnson LLP

(57) ABSTRACT

A tablet bumper assembly is disclosed. According to one embodiment, an apparatus includes a bumper assembly having a first opening, a second opening, and a first protruding region at a first corner, where the first opening is configured to position the bumper assembly around a peripheral edge of a tablet computer, the second opening is configured to expose a display screen of the tablet computer, and the first protruding region prevents the tablet computer from lying flat on a support surface to allow air-cooling of the tablet computer.

26 Claims, 1 Drawing Sheet

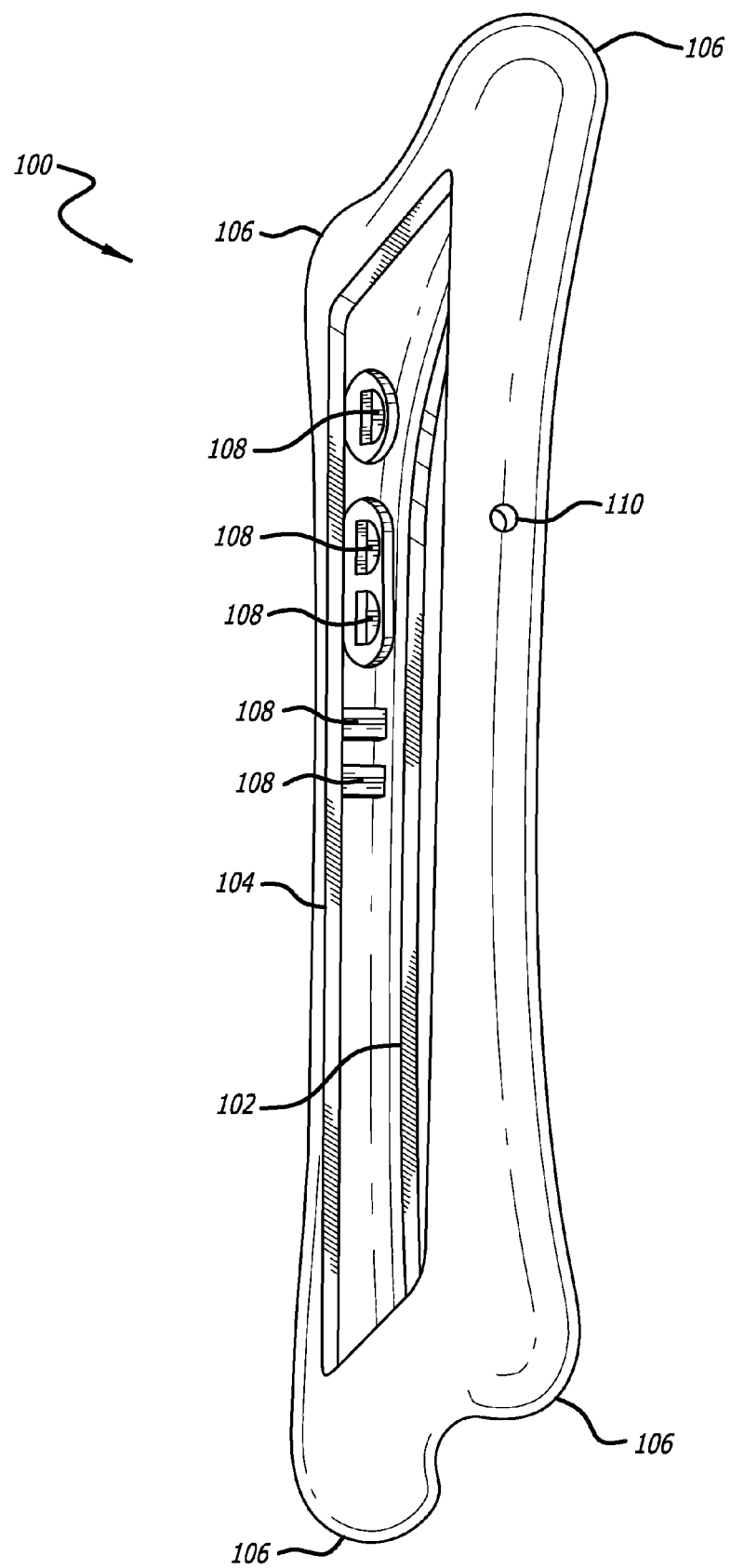

TABLET BUMPER ASSEMBLY

CROSS-REFERENCE TO RELATED APPLICATIONS

The present application claims priority to U.S. Provisional Patent Application No. 61/862,903 filed on Aug. 6, 2013, entitled "Tablet Bumper Assembly", which is herein incorporated by reference.

FIELD

The present disclosure relates in general to a protective case for a portable electronic device. In particular, the present disclosure relates to a bumper assembly for a tablet computer.

BACKGROUND

Recent advances in electronics and communications systems have introduced various portable electronic devices, for example, cell phones, portable audio players, and tablet computers. These portable electronic devices are enjoyed by users every day around the world. Unfortunately, these portable electronic devices are typically delicate and subject to internal damage when they are dropped, bumped, and/or suffer an impact. For example, when a device having a touch screen (e.g., a cell phone and a tablet computer) is dropped, the touch screen can easily shatter. Repairing the touch screen is time consuming and costly to the user.

SUMMARY

A tablet bumper assembly is disclosed. According to one embodiment, an apparatus includes a bumper assembly having a first opening, a second opening, and a first protruding region at a first corner, where the first opening is configured to position the bumper assembly around a peripheral edge of a tablet computer, the second opening is configured to expose a display screen of the tablet computer, and the first protruding region prevents the tablet computer from lying flat on a support surface to allow air-cooling of the tablet computer.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 1 illustrates an exemplary tablet bumper assembly, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A tablet bumper assembly is disclosed. According to one embodiment, an apparatus includes a bumper assembly having a first opening, a second opening, and a first protruding region at a first corner, where the first opening is configured to position the bumper assembly around a peripheral edge of a tablet computer, the second opening is configured to expose a display screen of the tablet computer, and the first protruding region prevents the tablet computer from lying flat on a support surface to allow air-cooling of the tablet computer.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a tablet bumper assembly. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense and are instead taught merely to describe particularly representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

According to one embodiment, the present system and method provides bumper assembly that protects a tablet computer from a damage caused by dropping and other impacts. The present bumper assembly is made of a flexible material and retains the tablet computer. The present bumper assembly includes an opening to allow a user to view the display screen of the tablet computer. The present bumper assembly further includes one or more protruding regions that prevent the tablet computer from lying flat on a horizontal surface (e.g., a tabletop) to facilitate air-cooling of the tablet computer. The present bumper assembly further includes one or more control portions to allow the user to activate a corresponding control on the exterior edge of the tablet computer. Each control portion is shaped and sized to match a corresponding control on the tablet computer. In one embodiment, the present bumper assembly includes one or more markings to indicate a location of the control covered by the bumper assembly. The present bumper assembly further includes one or more holes to allow an insertion of a device (e.g., a memory chip, a plug to a peripheral device such as a headset, and a tip of a stylus) into the tablet computer.

FIG. 1 illustrates an exemplary bumper assembly for a tablet computer, according to one embodiment. The bumper assembly 100 is made of a flexible material that is placed on a tablet computer (not shown) so that the tablet computer is retained within the bumper assembly 100 to protect the tablet computer from an impact. The bumper assembly 100 includes a first opening 102 and a second opening 104. The first opening 102 is configured to receive the tablet computer so that the bumper assembly 100 is positioned around the peripheral edges of the tablet computer. The second opening 104 is configured to allow a user to view a display screen of the tablet computer. In one embodiment, the second opening 104 is further configured to receive a thin and transparent sheet that is positioned between the bumper assembly 100 and the display screen of the tablet computer to protect the display screen from a scratch and other hazards.

The bumper assembly 100 further includes four protruding regions 106 that are formed at a corner of the bumper assembly 100. The protruding regions 106 operate as feet that support the tablet computer on a horizontal surface, for example, a tabletop. As will be appreciated by those skilled in the art, the protruding regions 106 raise the tablet computer above the horizontal support surface and facilitate airflow and cooling of the internal circuitry of the tablet computer. It is further appreciated that the bumper assembly 100 may include any number of protruding regions 106 and that the protruding regions 106 may be of the same or a different size and/or shape without deviating from the scope of the present disclosure. In one embodiment, each protruding region 106 includes a portion of flexible material that is thicker than other regions on the bumper assembly 100. This allows each corner of the bumper assembly 100 to have rounded edges. In another embodiment, two protruding regions 106 on one side of the bumper assembly 100 (e.g., top protruding regions) are larger than the other two protruding regions 106 on the opposite side of the bumper assembly 100 (e.g., bottom protruding regions). This allows the tablet computer to assume an angle relative to the horizontal support surface and improve the visibility of the display screen of the tablet computer.

The bumper assembly 100 further includes one or more of control portions 108 that are configured to enable the user to activate a corresponding control (e.g., a volume switch and a power button) on the exterior of the tablet computer. Each control portion 108 is aligned with a corresponding control on the exterior of the tablet computer. In one embodiment, the control portion 108 includes an area on the bumper assembly 100 where the flexible material is thinner than other regions on the bumper assembly 100. A user may activate the control on the exterior of the tablet computer by pushing on the control portion 108. It is appreciated that one or more markings may be advantageously applied to the exterior of the bumper assembly 100 to indicate the location and type of each exterior control of the tablet computer.

According to one embodiment, the control portion 108 includes an opening in the flexible material of the bumper assembly 100. Each opening is aligned with a specific control on the exterior of the tablet computer. Each opening may have a shape and/or a size that corresponds to the specific control that the opening is aligned with.

The bumper assembly 100 further includes one or more holes 110 that are sized and aligned with a corresponding control on the tablet computer. The one or more holes 110 are configured to receive a tip of a pointing instrument, for example, a stylus and other similar instruments, a headset plug and any plug for a peripheral device. In one embodiment, the hole 110 is shaped and sized to match a slot or a port on the tablet computer. This allows the user to insert a device (e.g., a memory card, and a plug to a peripheral device) into a corresponding slots or port on the tablet computer through the hole 110.

According to one embodiment, the flexible material of the bumper assembly 100 is pliable enough to allow the user to stretch the bumper assembly 100 around the peripheral edges of the computer while inserting the tablet computer into the first opening 102. The flexible material may be made of silicone, rubber, or any other flexible material. In another embodiment, the bumper assembly 100 is made of a rigid material, for example, thermoplastic. The first opening 102 is suitably configured to allow the user to press and snap the bumper assembly 100 onto the tablet computer, and further unsnap the bumper assembly 100 from the tablet computer. According to one embodiment, the thermoplastic material may include, but not limited to polyethylene, polycarbonate, and any other material that is suitable for protecting the tablet computer from an impact.

The above example embodiments have been described hereinabove to illustrate various embodiments of a tablet bumper assembly. Various modifications and departures from the disclosed example embodiments will occur to those having ordinary skill in the art. The subject matter that is intended to be within the scope of the disclosure is set forth in the following claims.

I claim:

1. An apparatus, comprising:
   a bumper assembly having a first opening, a second opening, and a first protruding region at a first corner,
      wherein the first opening is configured to position the bumper assembly around a peripheral edge of a tablet computer,
      wherein the second opening is configured to expose a display screen of the tablet computer, and
      wherein the first protruding region prevents the tablet computer from lying flat on a support surface to allow air-cooling of the tablet computer.

2. The apparatus of claim 1, wherein the bumper assembly includes a control portion that is configured to activate a corresponding control on the tablet computer.

3. The apparatus of claim 1, wherein the bumper assembly includes a hole that is configured to allow a device to be inserted into a port on the tablet computer.

4. The apparatus of claim 1, wherein the second opening is configured to receive a transparent sheet that is positioned between the bumper assembly and the display screen of the tablet computer.

5. The apparatus of claim 1, wherein the bumper assembly includes a second protruding region at a second corner,
   wherein the second protruding region prevents the tablet computer from lying flat on the support surface to allow air-cooling of the tablet computer,
   and wherein the first protruding region and the second protruding region have different sizes to allow the tablet computer to assume an angle relative to the support surface.

6. The apparatus of claim 1, wherein the first protruding region includes a thicker material as compared to a region of the bumper assembly that is adjacent to the first protruding region.

7. The apparatus of claim 2, wherein the control portion is aligned with the corresponding control.

8. The apparatus of claim 2, wherein the bumper assembly includes a marking that indicates a location of the control portion.

9. The apparatus of claim 2, wherein the control portion includes a thinner material as compared to a region of the bumper assembly that is adjacent to the control portion.

10. The apparatus of claim 2, wherein the control portion includes an opening in the bumper assembly, wherein the opening is aligned with the corresponding control, and wherein the opening has one or more of a shape and a size that matches the corresponding control.

11. The apparatus of claim 3, wherein the hole is aligned with the port on the tablet computer.

12. The apparatus of claim 1, wherein the bumper assembly includes a flexible material, wherein the flexible material includes one or more of silicone, and rubber.

13. The apparatus of claim 1, wherein the bumper assembly includes a rigid material, wherein the rigid material includes a thermoplastic material, wherein the thermoplastic material includes one or more of polyethylene and polycarbonate.

14. A method, comprising:
forming a bumper assembly having a first opening, a second opening, and a first protruding region at a first corner,
wherein the first opening is configured to position the bumper assembly around a peripheral edge of a tablet computer,
wherein the second opening is configured to expose a display screen of the tablet computer, and
wherein the first protruding region prevents the tablet computer from lying flat on a support surface to allow air-cooling of the tablet computer.

15. The method of claim 14, further comprising forming a control portion on the bumper assembly that is configured to activate a corresponding control on the tablet computer.

16. The method of claim 14, further comprising forming a hole on the bumper assembly that is configured to allow a device to be inserted into a port on the tablet computer.

17. The method of claim 14, further comprising configuring the second opening to receive a transparent sheet that is positioned between the bumper assembly and the display screen of the tablet computer.

18. The method of claim 14, further comprising forming a second protruding region at a second corner of the bumper assembly,
wherein the second protruding region prevents the tablet computer from lying flat on a surface,
and wherein the first protruding region and the second protruding region have different sizes to allow the tablet computer to assume an angle relative to the surface.

19. The method of claim 14, further comprising forming the first protruding region with a thicker material as compared to a region of the bumper assembly that is adjacent to the first protruding region.

20. The method of claim 15, further comprising aligning the control portion with the corresponding control.

21. The method of claim 15, further comprising applying a marking on the bumper assembly that indicates a location of the control portion.

22. The method of claim 15, further comprising forming the control portion with a thinner material as compared to a region of the bumper assembly that is adjacent to the control portion.

23. The method of claim 15, further comprising forming an opening in the control portion, wherein the opening is aligned with the corresponding control, and wherein the opening has one or more of a shape and a size that matches the corresponding control.

24. The method of claim 16, further comprising aligning the hole with the port on the tablet computer.

25. The method of claim 14, wherein the bumper assembly includes a flexible material, wherein the flexible material includes one or more of silicone, and rubber.

26. The method of claim 14, wherein the bumper assembly includes a rigid material, wherein the rigid material includes a thermoplastic material, wherein the thermoplastic material includes one or more of polyethylene and polycarbonate.

* * * * *